(12) United States Patent
Tavlarides et al.

(10) Patent No.: US 8,721,893 B2
(45) Date of Patent: May 13, 2014

(54) RARE EARTH ELEMENTS SEPARATION USING PHOSPHORUS BASED ADSORBENT

(75) Inventors: Lawrence Tavlarides, Fayetteville, NY (US); Hyung-Jun Park, Gyeonggi-do (KR)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 13/280,280

(22) Filed: Oct. 24, 2011

(65) Prior Publication Data

US 2012/0100049 A1 Apr. 26, 2012

Related U.S. Application Data

(60) Provisional application No. 61/405,992, filed on Oct. 22, 2010.

(51) Int. Cl.
*C01F 17/00* (2006.01)

(52) U.S. Cl.
USPC .......................................... 210/660; 423/21.5

(58) Field of Classification Search
USPC ........... 423/21.5, 263; 210/656–686; 502/407
See application file for complete search history.

(56) References Cited

U.S. PATENT DOCUMENTS 2,956,858 A * 10/1960 Spedding et al. ............ 423/21.5

FOREIGN PATENT DOCUMENTS

JP 64-045719 * 2/1989

OTHER PUBLICATIONS

Palmieri, M. C.; Garcia, Jr., O.; Melnikov, P., Neodymium biosorption from acidic solutions in batch system. Process Biochem. 2000, 36, (5), 441-444.
Dev, K.; Pathak, R.; Rao, G. N., Sorption behaviour of lanthanum(III), neodymium(III), terbium(III), thorium(IV) and uranium(VI) on Amberlite XAD-4 resin functionalized with bicine ligands. Talanta 1999, 48, (3), 579-584.
Guo, J.; Cai, J.; Su, Q., Ion imprinted polymer particles of neodymium: synthesis, characterization and selective recognition. Journal of Rare Earths 2009, 27, (1), 22-27.
Hubicka, H.; Drobek, D., Studies on separation of iminodiacetate complexes of lanthanum (III) from neodymium (III) and praseodymium (III) on anion-exchangers. Hydrometallurgy 1998, 50, (1), 51-60.
Kaur, H.; Agrawal, Y. K., Functionalization of XAD-4 resin for the separation of lanthanides using chelation ion exchange liquid chromatography. React. Funct. Polym. 2005, 65, (3), 277-283.
Zhang, A.; Hu, Q.; Wang, W.; Kuraoka, E., Application of a Macroporous Silica-Based CMPO-Impregnated Polymeric Composite in Group Partitioning of Long-Lived Minor Actinides from Highly Active Liquid by Extraction Chromatography. Ind. Eng. Chem. Res. 2008, 47, (16), 6158-6165.

Lee, J. S.; Gomez-Salazar, S.; Tavlarides, L. L., Synthesis of thiol functionalized organo-ceramic adsorbent by sol-gel technology. React. Funct. Polymt. 2001, 49, (2), 159-172.
Nam, K. H.; Gomez-Salazar, S.; Tavlarides, L. L., Mercury(II) Adsorption from Wastewaters Using a Thiol Functional Adsorbent. Ind. Eng. Chem. Res. 2003, 42, (9), 1955-1964.
Park, H. J.; Tavlarides, L. L., Adsorption of Chromium(VI) from Aqueous Solutions Using an Imidazole Functionalized Adsorbent. Ind. Eng. Chem. Res. 2008, 47, (10), 3401-3409.
Park, H. J.; Tavlarides, L. L., Germanium(IV) Adsorption from Aqueous Solution Using a Kelex-100 Functional Adsorbent. Ind. Eng. Chem. Res. 2009, 48, (8), 4014-4021.
Gomez-Salazar, S.; Lee, J. S.; Heydweiller, J. C.; Tavlarides, L. L., Analysis of Cadmium Adsorption on Novel Organo-Ceramic Adsorbents with a Thiol Functionality. Ind. Eng. Chem. Res. 2003, 42, (14), 3403-3412.
Nilsson, M.; Nash, K. L., Trans-Lanthanide Extraction Studies in the TALSPEAK System: Investigating the Effect of Acidity and Temperature. Solvent Extr. Ion Exch. 2009, 27, (3), 354-377.
Nilsson, M.; Nash, K. L., Review Article: A Review of the Development and Operational Characteristics of the Talspeak Process. Solvent Extr. Ion Exch. 2007, 25, (6), 665-701.
Arichi, J.; Goetz-Grandmont, G. E.; Brunette, J. P., Solvent extraction of europium(III) from nitrate medium with 4-acyl-isoxazol-5-ones and 4-acyl-5-hydroxy-pyrazoles. Effect of salts and diluents. Hydrometallurgy 2006, 82, (1-2), 100-109.
Kao, H.-C.; Yen, P.-S.; Juang, R.-S., Solvent extraction of La(III) and Nd(III) from nitrate solutions with 2-ethylhexylphosphonic acid mono-2-ethylhexyl ester. Chem. Eng. J. 2006, 119, (2-3), 167-174.
Nam, K. H.; Tavlarides, L. L, Synthesis of a High-Density Phosphonic Acid Functional Mesoporous Adsorbent: Application to Chromium(III) Removal. Chem. Mater. 2005, 17, (6), 1597-1604.
Baker, C. F.; Messmer, R. E., The Hydrolysis of Cations. John Wiley & Sons: Florida., 1986.
Microcal Origin, version 7.5; Microcal Software, Inc: Northampton, MA, 1997.
Tien, C., Adsorption Calculation and Modeling; Butterworth-Heinemann: Newton, MA, 1994.
Crittenden, J. C.; Webber, J., Predictive Model for Design of Fixed-Bed Adsorbers: Parameter Estimation and Model Development. J. Environ. Eng. Div. 1978, 104, (2), 185-197.
Wilson, E. J.; Geankoplis, C. J., Liquid Mass Transfer at Very Low Reynolds Numbers in Packed Beds. Ind. Eng. Chem. Fund. 1966, 5, (1), 9-14.
Seader, J. D.; Henley, E. J., Separation Process Principles. John Wiley & Sons: New York, 1998.
Tan, X.; Fang, M.; Li, J.; Lu, Y.; Wang, X., Adsorption of Eu(III) onto TiO2: Effect of pH, concentration, ionic strength and soil fulvic acid. Journal of Hazardous Materials 2009, 168, (1), 458-465.
Wang, X; Xu, D.; Chen, L.; Tan, X.; Zhou, X.; Ren, A.; Chen, C., Sorption and complexation of Eu(III) on alumina: Effects of pH, ionic strength, humic acid and chelating resin on kinetic dissociation study. Applied Radiation and Isotopes 2006, 64, (4), 414-421.

(Continued)

*Primary Examiner* — Steven Bos
(74) *Attorney, Agent, or Firm* — Frederick J. M. Price; Bond Schoeneck & King, PLLC

(57) ABSTRACT

The present invention relates to methods for the separation of rare earth elements from aqueous solutions and, more particularly, to the separation of lanthanides (e.g., neodymium (III)) from aqueous solutions using an organo phosphorus functionalized adsorbent.

11 Claims, 14 Drawing Sheets

(56) References Cited

OTHER PUBLICATIONS

Pathak, P.; Choppin, G., Sorption of Am3+ cations on suspended silicate: Effects of pH, ionic strength, complexing anions, humic acid and metal ions. Journal of Radioanalytical and Nuclear Chemistry 2007, 274, (3), 517-523.

Kosmulski, M., Adsorption of Trivalent Cations on Silica. Journal of Colloid and Interface Science 1997, 195, (2), 395-403.

Luzenkirchen, J., Ionic Strength Effects on Cation Sorption to Oxides: Macroscopic Observations and Their Significance in Microscopic Interpretation. Journal of Colloid and Interface Science 1997, 195, (1), 149-155.

Sivaraman, N.; Kumar, R.; Subramaniam, S.; Vasudeva Rao, P., Separation of lanthanides using ion-interaction chromatography with HDEHP coated columns. Journal of Radioanalytical and Nuclear Chemistry 2002, 252, (3), 491-495.

Konishi, Y.; Asai, S.; Shimaoka, J.; Miyata, M.; Kawamura, T., Recovery of neodymium and ytterbium by biopolymer gel particles of alginic acid. Ind. Eng. Chem. Res. 1992, 31, (10), 2303-2311.

Siva Kesava Raju, C.; Subramanian, M. S., Sequential separation of lanthanides, thorium and uranium using novel solid phase extraction method from high acidic nuclear wastes. Journal of Hazardous Materials 2007, 145, (1-2), 315-322.

\* cited by examiner

RARE EARTH ELEMENTS SEPARATION USING PHOSPHORUS BASED ADSORBENT

RELATED APPLICATION

The present application claims priority to U.S. provisional patent application No. 61/405,992, filed on Oct. 22, 2010; all of the foregoing patent-related document(s) and attached appendices are hereby incorporated by reference herein in their respective entirety(ies).

FEDERALLY SPONSORED RESEARCH OR DEVELOPMENT

The U.S. Government may have certain rights in this invention pursuant to Grant No. CTS-0120204 awarded by the National Science Foundation.

BACKGROUND OF THE INVENTION

1. Field of the Invention

The present invention relates to methods for the separation of rare earth elements from aqueous solutions and, more particularly, to the separation of lanthanides (e.g., neodymium(III)) from aqueous solutions using an organo phosphorus functionalized adsorbent.

2. Description of the Related Art

Rare earth metals are a collection of seventeen chemical elements in the periodic table, namely scandium, yttrium, and the fifteen lanthanides. Scandium and yttrium are also considered rare earths because they tend to occur in the same ore deposits as the lanthanides and exhibit similar chemical properties. Furthermore, the study of rare earth elements ("REE") is relevant in the separation of REE/lanthanides from actinides in the treatment of spent nuclear fuels because actinides, especially Am(III) and Cm(III), have similar geochemical properties as REE.

Over the past several decades the demand for rare earths has increased and the necessity for the high purity of these elements requires the selective separation of the lanthanides which is thus still of great interest and importance. The separation of lanthanides is a difficult task because of their similar chemical structure and physical properties.

Extraction and pre concentration of these valuable ions from wastes are extremely important not only from the view of their limited resource availability, but also for the reduction of their quantum for disposal as radioactive wastes. Numerous processes have been applied for effectively reducing lanthanide ions from various aqueous solutions including ion exchange, chelating polymer resin, solvent extraction, and adsorption.

Description of the Related Art Section Disclaimer: To the extent that specific publications are discussed above in this Description of the Related Art Section or elsewhere in this application, these discussions should not be taken as an admission that the discussed publications are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section (as well as throughout the application), they are all hereby incorporated by reference into this document in their respective entirety(ies).

SUMMARY OF THE INVENTION

The present invention recognizes that there are potential problems and/or disadvantages in the conventional rare earth elements adsorption techniques, which do not address the issue of high adsorption capacity, high selectivity over other metal ions, and adsorbent stability. For example, many types of ion exchange and chelating polymer resins are used for removing or recovering metal ions from industrial waste water. Ion exchange resins can substantially remove metal ions; however, they do not show mechanical strength due to the swelling of the polymeric skeleton. Chelating resins are frequently used in analytical chemistry for preconcentration of metal ions and their separation from interfering constituents prior to their determination by an instrumental method. But, many chelating resins show limited applicability due to their poor hydrophilicity, small surface area, and slow adsorption rate which also is a disadvantage in the regeneration step. Although classical solvent extraction processes are widely used, the process unavoidably generates secondary liquid waste which results from the hydrolytic and radiolytic degradation of extractants and diluents. Various embodiments of the present invention may be advantageous in that they may solve or reduce one or more of the potential problems and/or disadvantages discussed above in this paragraph.

It is therefore a principal object and advantage of the present invention to provide a method related to an adsorption separation process to separate rare earth elements from aqueous solutions. This type of method has the advantage of combining the selectivity of solvent extraction with the simplicity of a multistage column system. In comparison with the liquid-liquid solvent extraction process, it has many advantages such as regeneration of column, compact equipment, simultaneous separation, and less waste accumulation.

It is a further object and advantage of the present invention to provide adsorbent materials that have a higher capacity; high acid stability; controlled pore size and distribution; high selectivity; providing superior kinetic performance capabilities; rare earth element separation from complex mixtures; and better mechanical properties than resins (do not swell or shrink).

In accordance with the foregoing objects and advantages and as described further in the Detailed Description Section herein, an embodiment of the present invention relates to the investigation of the separation of neodymium(III) from aqueous solutions using a phosphorus based sol-gel adsorbent. This adsorbent has been formed by the sol-gel synthesis method. The speciation diagram of Nd(III) in an aqueous phase with varying pH is studied by analyses of the equilibria equations. Batch adsorption equilibrium studies show an increase in neodymium uptake capacity with increase in pH in the range from 0.5 to 6.5, and the maximum uptake capacity at pH 6 is observed to be 1.13 mmol/g (160 mg/g). The equilibrium adsorption isotherm gives a satisfactory fit of the adsorption data. A kinetics study conducted with different concentrations and particle sizes of neodymium(III) in a batch reactor shows a high rate of adsorption. The adsorbent shows a capability of selectivity towards Nd(III) and other rare earths. Adsorption tests in a fixed bed column show a sharp breakthrough curve. Stripping of the neodymium-loaded column bed is achieved using 1 M $HNO_3$. The material also has sustainable stability over repeated metal loading and stripping in a column. In addition to the experimental studies, the adsorption processes in batch and packed column systems are successfully modeled by using a pore diffusion model and the results are presented. The organo phosphorus functionalized adsorbent is demonstrated to be an effective sorbent material for the separation of neodymium(III) from aqueous solutions.

In accordance with an embodiment of the present invention, as discussed throughout this Application, an exemplary immediate application of the technology is adsorptive separation of rare earth elements in aqueous solutions. There is set forth herein an organo-ceramic composite material useful for the extraction of rare earth elements from solutions. These solutions can be leachate solutions from mining operations. Materials set forth herein can replace resins for removal of rare earth elements from solution. Further applications of the technology relate to methods of removing and recovering of metal ions from aqueous stream, which include contacting a water stream containing metal ions with an organo-composite material of the present application. This contacting can be accomplished using fixed bed adsorbers.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
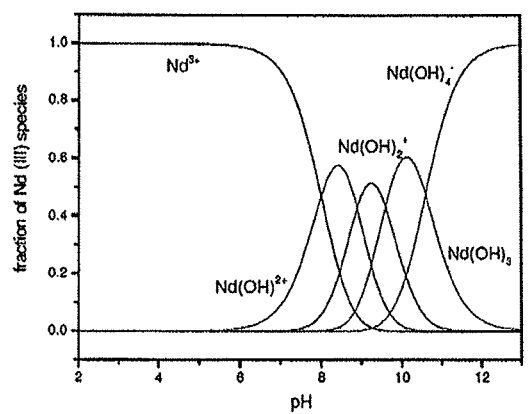
FIG. 1 is a graphical illustration showing the relative distribution of Nd(III) species in the aqueous solution calculated with the given thermodynamic constants, according to an embodiment of the present invention.

The present invention will be more fully understood and appreciated by reading the following Detailed Description in conjunction with the accompanying drawings, wherein like reference numerals refer to like components.

As shown and described herein, in accordance with an embodiment of the present invention, a method including synthesizing an adsorbent using phosphoric acid as a chelating agent by incorporating the chelate into a silica matrix by sol-gel processing is described. Subject matter of the disclosure herein includes synthesis of a phosphorus based functional precursor silane, adsorption equilibrium isotherms, the kinetics in batch and fixed-bed columns, the selectivity in the presence of other competing ions, and the operational stability of the functionalized sol-gel adsorbent, and the development of adsorption models for batch and packed column contacting systems.

NOMENCLATURE/VARIABLE DEFINITIONS

The following is a list of nomenclature and/or variables and their respective definitions as used herein:
$c$=neodymium(III) concentration in the pore, mmol/L
$c_b$=neodymium(III) concentration of the bulk, mmol/L
$c_{bo}$=initial neodymium(III) concentration of the bulk, mmol/L
$c_s$=neodymium(III) concentration at the pellet surface, mmol/L
$c_T$=total neodymium(III) concentration, mmol/L
$D_p$=pore diffusion coefficient, m²/s
$D_M$=molecular diffusion coefficient, m²/s
$K_{Eq}$=equilibrium constant, g²/L²
$K_d$=distribution coefficient, L/g
$k_f$=film coefficient, cm/s
$k_{1f}$=forward reaction rate constant, L/mmol/min
$k_{1r}$=reverse reaction rate constant, L/mmol/min
q=local concentration in the pellet, mmol of Nd/g of adsorbent
q=average neodymium concentration in the pellet, mmol of Nd/g of adsorbent
r=radial direction of the pellet, cm
$R_p$=radius of pellet, cm
$q_{max}$=max capacity of the adsorbent, mmol/g
t=time, min
$u_s$=superficial velocity, cm/s
V=volume of solution, L
$V_R$=volume of reactor, L
$V_T$=volume of tank, L
z=axial direction in the column, cm
τ=particle tortuosity
$\epsilon_p$=pellet porosity
$\epsilon_b$=bed porosity
$\rho_p$=pellet density, g/cm³
$\rho_b$=bed density, g/cm³
$\rho_s$=solid density of the adsorbent, g/cm³
θ=corrected time of column calculations, t−zε/$u_s$; min, s Advantages of the invention are illustrated by the following Background Theory and Examples Sections. However, the particular materials and amounts thereof recited in these examples, as well as other conditions and details, are to be interpreted to apply broadly in the art and should not be construed to unduly restrict or limit the invention in any way.

Materials and/or Equipment

The following materials and/or equipment were used in the following Examples. A thermostatically controlled shaker bath (Precision Scientific model 50) is used in batch adsorption experiments. Analyses of total concentration of lanthanides are measured with ICP-MS (Perkin-Elmer model Elan 6100). Batch adsorption experiments are conducted in a temperature controlled shaker water bath for 24 h to achieve equilibrium states. pH is measured using a Chemcadet pH meter. Fixed-bed experiments are studied with a 0.7 cm ID column and cartridge pump (Master Flex model 7519-20) to control flow rate. A 20 mmol/L Nd(III) stock solution is prepared by dissolving neodymium oxide (Sigma Aldrich) in nitric acid and diluting with DI water.

EXAMPLES

Example 1

Background Theory—Distribution Equilibrium of Neodymium(III)

This Example describes aspects of the background theory of an embodiment of the present invention. The Evaluation of aqueous phase equilibrium concentrations of neodymium species using appropriate chemical reaction equilibrium analyses to understand the distribution of various forms of neodymium(III) ions in solution is described herein. The cations of neodymium are known to exist in the following forms depending on the pH of the aqueous solution. The proposed reaction mechanism following Baker, C. F.; Messmer, R. E., The Hydrolysis of Cations. John Wiley & Sons: Florida., 1986:

$$Nd^{3+} + H_2O \leftrightarrow Nd(OH)^{2+} + H^+ \quad \log K = -8 \quad (1)$$

$$Nd^{3+} + 2H_2O \leftrightarrow Nd(OH)_2^+ + 2H^+ \quad \log K = -16.7 \quad (2)$$

$$Nd^{3+} + 3H_2O \leftrightarrow Nd(OH)_3 + 3H^+ \quad \log K = -26.5 \quad (3)$$

$$Nd^{3+} + 4H_2O \leftrightarrow Nd(OH)_4^- + 4H^+ \quad \log K = -37.1 \quad (4)$$

The relative distribution of Nd(III) species in the aqueous solution calculated with the given thermodynamic constants is shown in FIG. 1 (Speciation of Neodymium (III) in an aqueous solution, total concentration 1 mmol/L). Neodymium ion species in the aqueous solution evaluated using the analyses show that $Nd^{3+}$ is the main species in acidic solution, and formation of $Nd(OH)^{2+}$ occurs above pH 5.5. Hydrolysis proceeds very rapidly over a narrow pH range from $Nd^{3+}$ to $Nd(OH)_3^0$, with little evidence of intermediate species such as $Nd(OH)_2^+$ or $Nd(OH)^{2+}$.

Because the sol-gel adsorbents act as an ion exchanger, trivalent rare earth metal ions in the liquid phase are likely to exchange with $H^+$ in the adsorbent phase. Under most conditions, three hydrogen bonded dimers surround one metal ion as defined by the following overall ion reaction (See Nilsson, M.; Nash, K. L., Review Article: A Review of the Development and Operational Characteristics of the TALSPEAK Process. Solvent Extr. Ion Exch. 2007, 25, (6), 665-701.).

$$Nd^{+3} + 3\overline{(HA)_2} \leftrightarrow \overline{Nd(HA_2)_3} + 3H^+ \quad (5)$$

$$K_{Eq} = \frac{[\overline{Nd(HA_2)_3}][H^+]^3}{[Nd^{+3}][\overline{(HA)_2}]^3} (g^2/L^2) \quad (6)$$

where overbar indicates that a species is present in the adsorbent phase and HA denotes the functional groups of the adsorbent. Because three hydrogen ions are exchanged to the aqueous phase for each lanthanide cation, the extraction is very sensitive with pH change.

The distribution coefficient is calculated as $$Kd = \frac{[\overline{Nd(HA_2)_3}]}{[Nd^{+3}]} = \frac{C_i - C_e}{C_e} \frac{V_s}{W_e} (L/g) \quad (7)$$

where $C_i$ is the initial concentration of element in the solution, $C_e$ is the equilibrium concentration of element in the solution, $V_s$ is the volume of the solution and $W_e$ is the weight of the adsorbent. Combination of equation (6) and (7) gives $$Kd = K_{Eq} \frac{[\overline{(HA)_2}]^3}{[H^+]^3} \quad (8)$$

Since the functional groups in the adsorbent phase are consumed for binding lanthanide ions, the equilibrium concentration $[\overline{(HA)_2}]$ of free functional groups can be written in terms of the mass balance:

$$[\overline{(HA)_2}] = [\overline{(HA)_2}]_T - [\overline{Nd(HA_2)_3}] = q_{max} - q \quad (9)$$

$$Kd = K_{Eq} \left( \frac{[\overline{(HA)_2}]_T - [\overline{Nd(HA_2)_3}]}{[H^+]} \right)^3 = K_{Eq} \left( \frac{q_{max} - q}{[H^+]} \right)^3 \quad (10)$$

$$[\overline{Nd(HA_2)_3}] = q = [\overline{(HA)_2}]_T - [H^+]\left(\frac{Kd}{K_{Eq}}\right)^{1/3} = q_{max} - [H^+]\left(\frac{Kd}{K_{Eq}}\right)^{1/3} \quad (11)$$

Here, $[\overline{Nd(HA_2)_3}]$ is the metal uptake per unit mass of adsorbent (mmol/g); $[\overline{(HA)_2}]_T$ is the maximum capacity of the adsorbent (mmol/g); $K_{Eq}(g^2/L^2)$ is the equilibrium constant related to maximum adsorption capacity. The equilibrium constant $K_{Eq}$ is determined by fitting experimental data using the nonlinear regression method of Levenberg-Marquardt in Origin by Microcal (Microcal Origin, version 7.5; Microcal Software, Inc.: Northampton, Mass., 1997).

Background Theory—Adsorption Kinetics

Aqueous phase equilibrium concentrations of neodymium species are evaluated using the chemical equilibrium model described above. Diffusion and chemical reaction rate controlling schemes are investigated and compared to describe the adsorption kinetics. Surface diffusion and electrical potential effects are assumed to be negligible.

Background Theory—Chemical Reaction Model

This mechanism considers an overall ion exchange surface complexation reaction between neodymium ions and phosphorus groups in which hydrogen ions are released according to equation (5).

The reaction rate for this mechanism is:

$$\text{rate} = k_{1f}[Nd^{+3}][\overline{(HA)_2}]^3 - k_{1r}[\overline{Nd(HA_2)_3}][H^+]^3 = \quad (12)$$

$$k_{1f}\left([Nd^{+3}](q_{max} - q)^3 - \frac{q[H^+]^3}{K_{Eq}}\right)$$

where, $$[Nd^{+3}] = C_0 - q\frac{W_e}{V_s},$$

$k_{1f}$ and $k_{1r}$ are the forward and reverse reaction rate constants

The overall forward rate constant is estimated by numerical integration of the equation and minimizing absolute average relative deviation between calculated capacity and the experimentally measured capacity for a given time.

Background Theory—Film Pore Model

The film-pore model is developed by considering the transport of solutes through the film and pore to be rate controlling and that the particles are of spherical geometry. The macroscopic conservation equations of the model are (see Tien, C., Adsorption Calculation and Modeling; Butterworth-Heinemann: Newton, Mass., 1994):

$$V_T(c_{b_o} - c_b) = W_s \bar{q} \tag{13}$$

$$\bar{q} = \frac{3}{R^3} \int_0^R q r^2 \, dr \tag{14}$$

The particle is assumed to have randomly distributed uniform pores throughout. In the absence of potential gradients and assuming Fick's law applies, the metal ion species equation for adsorption can be written as $$\left[\varepsilon_p + \rho_p \frac{\partial q}{\partial c}\right] \frac{\partial c}{\partial t} = \frac{D_p}{r^2} \frac{\partial}{\partial r}\left(r^2 \frac{\partial c}{\partial t}\right) \tag{15}$$

Initial and boundary conditions of the partial differential equation with consideration of film mass transfer are given by $$c = 0, \quad t \leq 0 \quad 0 \leq r \leq R \tag{16a}$$

$$\frac{\partial c}{\partial r} = 0, \quad r = 0 \tag{16b}$$

$$k_f(c_b - c) = D_p \frac{\partial c}{\partial r}, \quad r = R \tag{16c}$$

Here, $\bar{q}$ is the neodymium concentration in the pellet which is averaged over the pellet volume; $V_T$ is the reservoir volume where changes in metal concentrations are measured; w is the mass of adsorbent; q is the local equilibrium neodymium concentration in the pellet; $c_b$ is the concentration of Nd(III) in the reservoir; $c_{bo}$ is the initial concentration of Nd(III) in the reservoir; c is the Nd(III) concentration in the adsorbent pore solutions; r is the radial distance from the adsorbent particle center assuming a spherical geometry; $\epsilon_p$ is particle porosity; $k_f$ is the external film-mass transfer coefficient; $P_p$ is the density of the particle; and $D_p$ is the pore diffusion coefficient.

These equations including the initial and boundary conditions are non-dimensionalized, transformed to a set of ordinary differential equations by taking radial finite differences, and solved by the technique of method of lines. In this computation, 100 radial grids for a particle are used for precise prediction of concentration profiles in the pores. Pore diffusion and external mass transfer coefficients are calculated by using the following correlations (see Crittenden, J. C.; Weber, J., Predictive Model for Design of Fixed-Bed Adsorbers: Parameter Estimation and Model Development. J. Environ. Eng. Div. 1978, 104, (2), 185-197.):

$$D_p = \frac{\varepsilon_p D_M}{\tau} \tag{17}$$

$$k_f = J_D \frac{u_s}{Sc^{2/3}} \tag{18}$$

where $D_M$ is the molecular diffusivity of Nd(III), $\tau$ is the tortuosity of the adsorbent, $u_s$ is the fluid superficial velocity, Sc is the Schmidt number, and $J_D$ is the Colburn coefficient evaluated using the correlation given by Wilson and Geankoplis (see Wilson, E. J.; Geankoplis, C. J., Liquid Mass Transfer at Very Low Reynolds Numbers in Packed Beds. Ind. Eng. Chem. Fund. 1966, 5, (1), 9-14.).

Background Theory—Fixed Bed Column

The material balance over the fixed bed for this study neglects axial dispersion and assumes constant superficial velocity and bed porosity. The model for the particle includes mass transfer resistances through the external liquid film and pores of the adsorbent. The pore diffusion model (Eq. 15) with initial and boundary conditions (Eq. 16a-c), parameter correlations, and the equilibrium isotherm (Eq. 11) are coupled and solved with the mass balance equation for the column.

The column mass balance equation is given by:

$$u_s \frac{\partial c_b}{\partial z} + \varepsilon \frac{\partial c_b}{\partial t} + \rho_b \frac{\partial \bar{q}}{\partial t} = 0 \tag{19}$$

$$\frac{\partial \bar{q}}{\partial t} = \frac{3k_f}{R\rho_p}(c_b - c|_{r=R}) \tag{20}$$

$$c_b = 0, \quad z \geq 0 \text{ and } t \leq 0, \tag{21a}$$

$$c_b = c_{b0}, \quad z = 0 \text{ and } t > 0. \tag{21b}$$

Here $\epsilon$ is the packed column void fraction ($\epsilon$=0.41), $\rho_b$ is the bulk density of the bed ($\rho_b$=0.65 g/cm³), R is the average particle radius ($1.53 \times 10^{-2}$ cm), $c|_{r=R}$ is the neodymium concentration at particle outer surface, and $c_b$ is the neodymium concentration in feed solutions.

The method of lines is used to solve both sets of equations simultaneously. In this method, the number of radial grids of a particle and axial grids of the column in the computation are 51 and 125, respectively. Details of the computational technique can be found elsewhere (see Gomez-Salazar, S.; Lee, J. S.; Heydweiller, J. C.; Tavlarides, L. L., Analysis of Cadmium Adsorption on Novel Organo-Ceramic Adsorbents with a Thiol Functionality. Ind. Eng. Chem. Res. 2003, 42, (14), 3403-3412.).

Example 2

Materials and Reagents

This example describes the synthesis and preparation for characterization of an adsorbent of an embodiment of the present invention.

Figure 2:
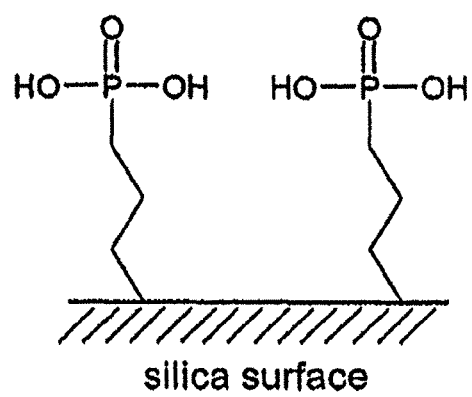
FIG. 2 is an illustration of phosphonic acid functional SOL-PHONIC adsorbent, used in accordance with an embodiment of the present invention.
Figure 3:
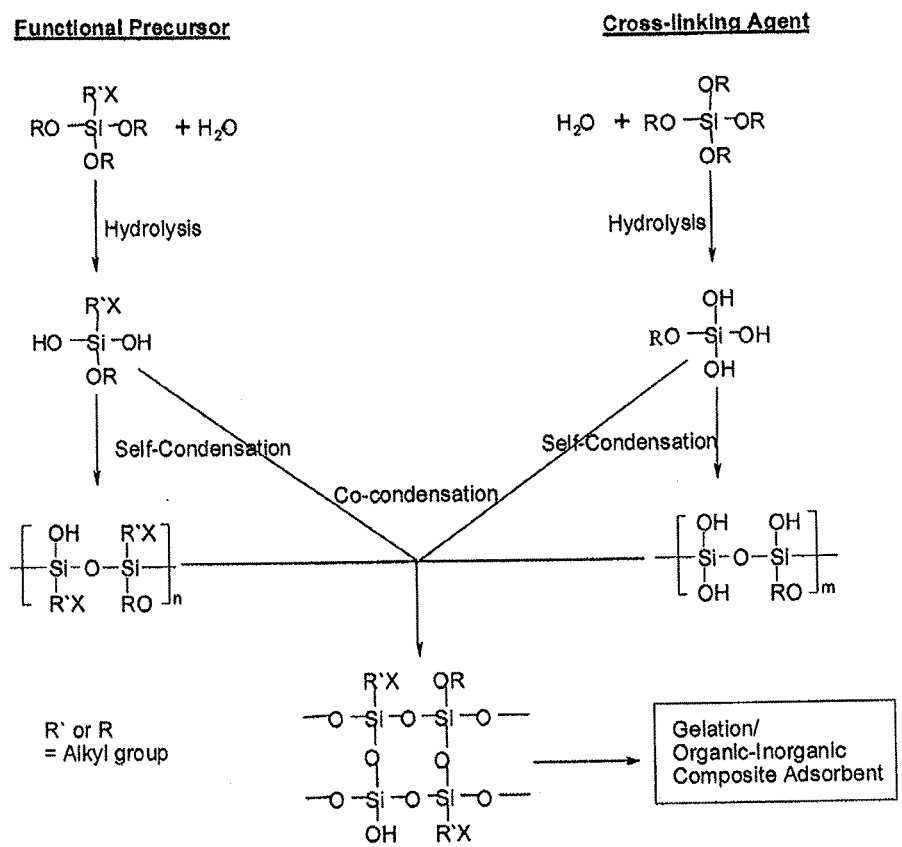
FIG. 3 is a schematic illustration showing an organo ceramic adsorbent prepared by the sol-gel synthesis method.

In one example, the adsorbent is a sol-gel material comprising clusters of phosphoric acid on the pore surface and silica backbone. Details of the adsorbent synthesis and structure are reported elsewhere and that synthesis procedure is employed here for adsorbent preparation (see Nam, K. H.; Tavlarides, L. L., Synthesis of a High-Density Phosphonic Acid Functional Mesoporous Adsorbent: Application to Chromium(III) Removal. Chem. Mater. 2005, 17, (6), 1597-1604.). This publication describes the synthesis of a high density phosphonic acid functional mesoporous adsorbent such as silyl-propyl-diethyl phosphonate ("SOL-PHONIC," reproduced at FIG. 2 herein) by sol-gel processing. See also FIG. 3, which shows a schematic illustration of an organo ceramic adsorbent prepared by the sol-gel synthesis method (see Lee, J. S.; Gomez-Salazar, S.; Tavlarides, L. L., Synthesis of thiol functionalized organo-ceramic adsorbent by sol-gel technology. *Reactive and Functional Polymers* 2001, 49, (2), 159-172).

The phosphonic acid functional precursor silane, trimethoxysilylpropyl-diethylphosphonate (DEPPS), is synthesized via the Michaelis Arbuzov reaction using 3-iodo-propyltrimethoxysilane (Aldrich) and triethyl phosphate (Aldrich). These chemicals are refluxed in a round-bottomed flask equipped with a condenser for 3 h at 160° C.

The adsorbent is synthesized by the independently hydrolyzed and condensed DEPPS and tetraethoxysilane (TEOS, Fluka). The molar ratio between DEPPS and TEOS is 1 to 1.25.

DEPPS is hydrolyzed and homocondensed for desired time at room temperature with the molar ratio of DEPPS:EtOH:Water:HCl=1:3:3:0.01. TEOS is hydrolyzed and homocondensed at room temperature with the molar ratio of TEOS:EtOH:Water:HCl=1:4:4:0.005. The required time of the DEPPS hydrolysis reaction was determine previously using Si NMR spectroscopy (see Nam, K. H.; Tavlarides, L. L., Synthesis of a High-Density Phosphonic Acid Functional Mesoporous Adsorbent: Application to Chromium(III) Removal. Chem. Mater. 2005, 17, (6), 1597-1604.).

These partially condensed silanes are mixed to form a homogeneous mixture to the two silanes, and followed by the addition of triethylamine [TEA; $N(CH_2-CH_3)_3$]. The gelled materials are aged for 24 h at 25° C. and dried for 24 h at 80° C. The materials are then subjected to reflux in concentrated hydrochloric acid at 80° C. for 24 h to convert the phosphonate groups ($P-OCH_2CH_3$) to phosphonic acids ($P-OH$). The mixture is cooled to room temperature and the materials are filtered and washed with DI water and acetone. The materials are then dried in an oven at 70° C. overnight. The dried adsorbents ("SOL-PHONIC") are crushed into the desired particle size ranges of 75~125 μm and 125~180 μm for characterization. Average pore diameter and surface area of the adsorbents are measured by nitrogen adsorption at 77 K with Micromeritics ASAP 2000. The final structure of the adsorbent has also been identified previously using $^{29}$Si CP-MAS NMR and $^{31}$P CP-MAS NMR (see Nam, K. H.; Tavlarides, L. L., Synthesis of a High-Density Phosphonic Acid Functional Mesoporous Adsorbent: Application to Chromium(III) Removal. Chem. Mater. 2005, 17, (6), 1597-1604.).

Example 3

Characterization

This example describes the characterization of the adsorbent synthesized and prepared for characterization in the previous Example.

The effect of solution pH on metal ion adsorption at 25° C. is investigated using 1 mmol/L of neodymium concentration at pH in the range from 1 to 7. A 0.05M acetate buffer is used. The initial concentrations of neodymium (III) were 1 mmol/L, and the initial pH of the solution was adjusted by adding either NaOH or $HNO_3$. The ionic strength of the solutions was less than $1.5 \times 10^{-2}$ mol/L.

Equilibrium uptake capacities of the adsorbent are determined by contacting 0.02 g of adsorbent with 20 mL of Nd(III) solution buffered by 0.05M acetate at various initial concentrations (0.01-7.5 mmol/L) and pH (3.0, 4.5, and 6.0) at room temperature. The amount of adsorbed neodymium ions is calculated by a mass balance between the initial and equilibrium concentrations. Neodymium uptake rate of the adsorbent is performed in a batch mode with two different initial metal ion concentrations (0.1 mmol/L, 1 mmol/L) at 25° C., each buffered by 0.05M acetate. To ensure complete wetting of the adsorbent, the weighed adsorbent is preconditioned in DI water for 24 h before contact with the metal solution. The batch reactor is a 500 mL beaker, in which a solution of 200 mL and the introduced adsorbent particles are stirred rapidly with a floating magnetic stirrer to ensure complete mixing. 0.1 mL samples are taken at desired reaction times between 0.5 and 360 minutes to prepare plots of C/C0 versus time. The solution volume changes due to sampling are not compensated for data analysis because only 1% of the initial volume of the solution is taken for the analysis of neodymium ion concentrations.

Batch selectivity for selected lanthanide metals is determined by simultaneous adsorption of Nd(III), Eu(III), Er(III), and Y(III) under equimolar concentration of each metal ion (0.25 mmol/L) in a 20 mL solution at pH 3 and 6 by contact with 0.02 g of adsorbent for 24 h at room temperature. The salts of these metals used in the solution preparation are neodymium oxide, europium oxide, erbium oxide, and yttrium oxide. The reaction mixture is filtered and the filtrate is collected for analyses.

The column adsorption performance is carried out using an initial neodymium concentration (1 mmol/L) at a flow rate of 1 mL/min through a 0.7 cm ID column packed with 0.3 g of adsorbent. Effluent solutions are collected at various volume intervals for analysis. Desorption experiments are executed in a 0.7 cm ID column using 1 mol/L of nitric acid. A 10 mL aliquot of DI water is used to wash the column before and after stripping steps to ensure discharge of remaining metal ions.

The column selectivity tests are performed using an equimolar concentration of trivalent lanthanide ions (neodymium, europium, and erbium) and yttrium. The experiment consists of flowing 350 mL of a stimulant at a flow rate of 1 mL/min through a 0.7 ID column packed with 0.3 g of adsorbent.

The stability of the adsorbent is tested by repeated adsorption and desorption experiments in a 0.7 cm ID column packed with 0.3 g of adsorbent.

Example 4

Adsorbent Characterization

This example describes the results of the characterization of the synthesized adsorbent described above.

The results of adsorbent characterization are summarized in Table 1, shown below. The adsorbent is observed to have a large pore diameter (44 Å) and pore volume (0.43 m3/g) with a pellet porosity of 0.41. The combined characteristics of relatively large pore size and pore volume can offer sufficient ligand accessibility for transport of neodymium complexes.

TABLE 1

Material Characteristics of the Adsorbents Used in This Study

| Functional group | Organo-phosphorate |
|---|---|
| Adsorbent skeleton | Silica |
| Pore volume | 0.43 m³/g |
| Pore diameter(Average) | 44 Å |
| Surface area | 397 m²/g |
| Pellet density [a] | 0.948 g/cm³ |
| Pellet porosity [a] | 0.41 |

[a] Calculated using correlations (see Seader, J. D.; Henley, E. J., Separation Process Principles. John Wiley & Sons: New York, 1998.).

Example 5

Neodymiun Ion Uptake as a Function of pH

Figure 4:
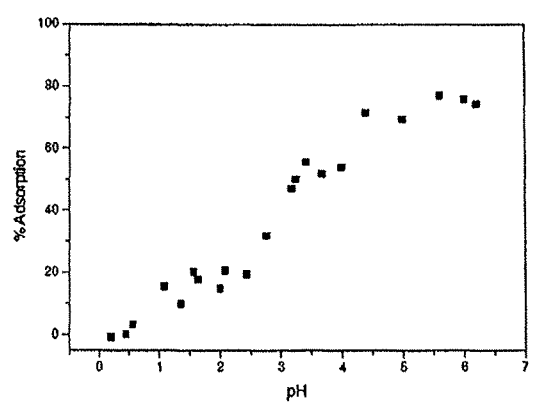
FIG. 4 is a graphical illustration showing the removal efficiency of Neodymium (III) with respect to the equilibrium pH over the range of 0 to 6.5, according to an embodiment of the present invention.

This example describes neodymium ion uptake as a function of pH. The pH dependency of the adsorption of neodymium (III) is investigated because of the variations of solution pH in various applications. FIG. 4 shows the removal efficiency of Neodymium (III) with respect to the equilibrium pH over the range of 0 to 6.5 (Effect of pH on the removal of Nd(III), Conditions: weight of adsorbent=0.05 g, volume of solution=50 mL, contact time=24 h, initial concentration=I ininol/L, buffered by 0.05 M acetate.).

As shown in FIG. 4, solution pH is the crucial factor to affect the adsorption of Nd(III). The adsorption of Nd(III) does not occur at pH<0.5, increases constantly at the pH range 2.5-5, and maintains a high level with increasing pH at pH>5. The pH reported is the equilibrium pH value, and it is noted that the pH range for each individual experiment has small variation from the equilibrium value ~±pH 0.1.

At higher pH values the neodymium ions form positively charged hydrolyzed species which are adsorbed, thereby leading to a high percentage of adsorption. However, the increase of extraction ratio (adsorption capacity) does not correspond with the hydrolytic form of Nd(III) in solution, because most of the Nd(III) species is $Nd^{3+}$ below pH 6. The strong pH dependent adsorption suggests that Nd(III) adsorption is attributed to inner-sphere surface complexation rather than ion exchange or outer-sphere surface complexation (see Tan, X.; Fang, M.; Li, J.; Lu, Y.; Wang, X., Adsorption of Eu(III) onto TiO2: Effect of pH, concentration, ionic strength and soil fulvic acid. Journal of Hazardous Materials 2009, 168, (1), 458-465.). Similar pH-dependent adsorption of lanthanides(III) was also observed by other researchers (see Wang, X.; Xu, D.; Chen, L.; Tan, X.; Zhou, X.; Ren, A.; Chen, C., Sorption and complexation of Eu(III) on alumina: Effects of pH, ionic strength, humic acid and chelating resin on kinetic dissociation study. Applied Radiation and Isotopes 2006, 64, (4), 414-421; Pathak, P.; Choppin, G., Sorption of Am3+ cations on suspended silicate: Effects of pH, ionic strength, complexing anions, humic acid and metal ions. Journal of Radioanalytical and Nuclear Chemistry 2007, 274, (3), 517-523; Kosmulski, M., Adsorption of Trivalent Cations on Silica. Journal of Colloid and Interface Science 1997, 195, (2), 395-403; Luzenkirchen, J., Ionic Strength Effects on Cation Sorption to Oxides: Macroscopic Observations and Their Significance in Microscopic Interpretation. Journal of Colloid and Interface Science 1997, 195, (1), 149-155).

Example 6

Equilibrium Studies

This example describes the results of equilibrium studies.

Figure 5:
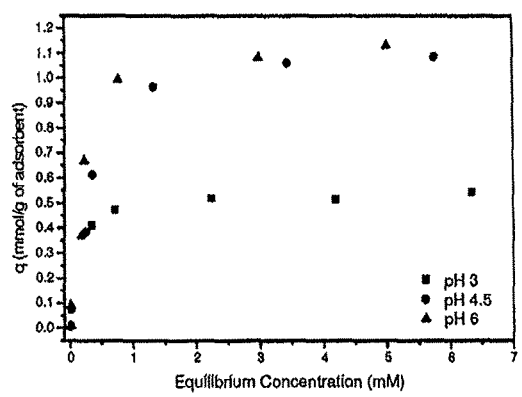
FIG. 5 is a graphical illustration showing adsorption equilibrium isotherm of Nd(III) at pH 3, 4.5, 6.0, according to an embodiment of the present invention.

Equilibrium uptake isotherms for neodymium are measured at three pH values (pH 3, 4.5, and 6), conditions: weight of adsorbent=0.02 g, volume=20 mL, contact time=24 h, buffered by 0.05 M acetate. As shown in FIG. 5, adsorption equilibrium isotherm of Nd(III) at pH 3, 4.5, 6.0 are shown and the neodymium uptake capacities are rapidly increased at low concentration. This implies that the adsorbent has strong affinity for neodymium. It is observed that the maximum Nd(III) adsorption capacity at pH 6 is 1.13 mmol/g, whereas at pH 3 and pH 4.5 the maximum capacities are 0.56 and 1.08 mmol/g, respectively.

Figure 6:
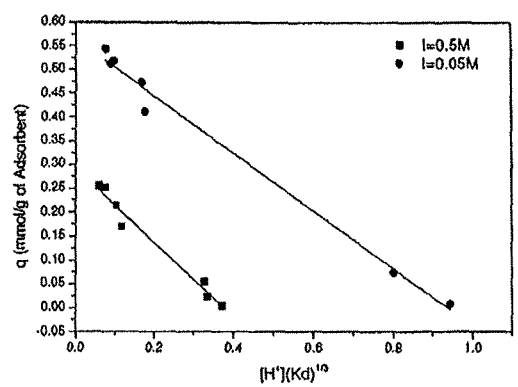
FIG. 6 is a graphical illustration showing graphical estimation of maximum capacity and equilibrium constant with different ionic strength of solution at pH 3, according to an embodiment of the present invention.

FIG. 6 shows the graphical estimation of Nd(III) maximum capacity and equilibrium constant with different ionic strength of solution at pH 3 (Conditions: weight of adsorbent=0.02 g, volume=20 mL initial concentration 0.01-7.5 mmol/L contact time=24 h, equilibrium pH=3-3.2, ionic strength was adjusted with sodium nitrate. Solid lines represent predictions of the eq 11.). An increase in capacity of neodymium by a decrease in ionic strength is shown. The adsorption capacity is evaluated as 0.56 mmol/g and 0.29 mmol/g for lower and higher ionic strength. Equilibrium constant was calculated from the slope, and the fitted values for the above adsorption mechanism are 4.54 $g^2/L^2$ and 2.12 $g^2/L^2$ for low and high ionic strength, respectively.

Equation (11) is employed to determine the equilibrium constant, $K_{eq}$, using the nonlinear regression technique of the modified Gauss-Newton algorithm of Levenberg-Marquardtv (see Microcal Origin, version 7.5; Microcal Software, Inc.: Northampton, Mass., 1997). The equilibrium constant is estimated by numerical integration of the equation and minimizing absolute average relative deviation (AARD) between the computed uptake capacity and experimentally measured uptake capacity for which:

$$AARD = \frac{1}{m \cdot n} \sum_{1}^{m} \sum_{1}^{n} \left| \frac{q_{j,calc} - q_{j,exp}}{q_{j,exp}} \right|_{i,j} \quad (22)$$

where m is the total number of data sets, n is the number of data points for one given set, $q_{j,calc}$ and $q_{j,exp}$ are the predicted and experimental amounts of neodymium adsorbed for a given data point j. The AARD result is 0.21 for the ion reaction model, and these results indicate the validity of the assumed equilibrium for the neodymium and sol-gel adsorbent system.

Figure 7:
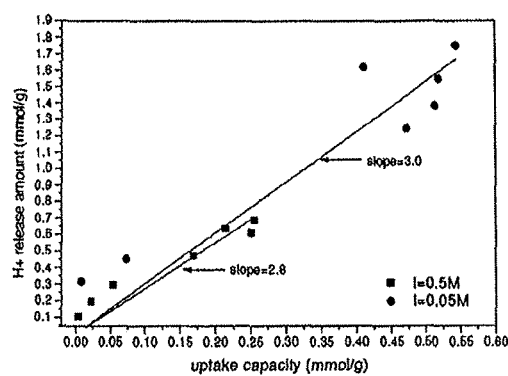
FIG. 7 is a graphical illustration showing the released amounts of [H+] as a function of the uptake capacity of the neodymium ion, according to an embodiment of the present invention.

FIG. 7 shows the relationship between neodymium ion uptake and hydrogen ion release (Conditions: weight of adsorbent=0.02 g, volume=20 mL, initial concentration 0.01-7.5 mmol/L, contact time=24 h, equilibrium pH=3-3.2, ionic strength was adjusted with sodium nitrate. Solid lines represent the experimental data trend with correlation coefficients of 0.82 and 0.80 for I=0.5 and I=0.05, respectively.). FIG. 7 shows released amounts of [H+] as a function of the uptake capacity, plotted according to the explicit expression for equation (5). For neodymium adsorption at each ionic strength, the data points fall on straight line with slopes of approximately 3.0 with correlation coefficients of 0.82 and 0.80 for I=0.5 and I=0.05, respectively. It is evident from FIG. 7 that the number of moles of [H+] released is three times that of adsorbed Nd(III). These results indicate that the adsorption reaction with trivalent neodymium and the phosphonic acid based adsorbent follow according to reaction equation (5), and support this proposed model based on the 3:1 reaction mechanism.

Example 7

Adsorption Kinetics

This example describes the adsorption kinetics of the adsorbent.

Figure 8:
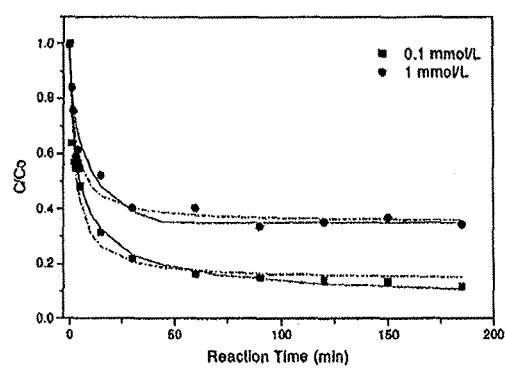
FIG. 8 is a graphical illustration showing adsorption kinetics of neodymium (III) for different neodymium concentrations, according to an embodiment of the present invention.

Two 200 mL solutions of different initial concentrations of neodymium (0.1 and 1 mmol/L) at pH 3 are placed in contact in a batch mode with 0.2 g of the adsorbent. Kinetic data for adsorption obtained at different neodymium concentration are shown in FIG. 8, where the C/C0 is plotted against time. The neodymium concentration is rapidly reduced up to 50% of original concentration within few minutes, and equilibrium is reached within 60 minutes of contact time. The rapid adsorption equilibrium is an indication that the surface of the adsorbent is readily available for adsorption. In addition, this may also be due to the available open pore channels accompanied by hydrophilic pore surfaces, and rapid kinetics.

FIG. 8 shows adsorption kinetics of neodymium (III) for different neodymium concentrations (Conditions: weight of adsorbent=0.2 g, volume=200 mL, pHi 3.2, particle size=125 im-I SO im. Solid lines represent predictions of the eqs 13-16; Dp=2.27×10.$^9$ m$^2$/s; r=3; AARD=0.03. Dot lines represent prediction of the eq 12; k1$_i$=1.81 L/mmol/min; AARD=0.07.). FIG. 8 also shows the theoretical predictions of the experimental data using the overall chemical reaction and film-pore model. To determine the forward reaction rate constant $k_{f1}$, the chemical reaction model described by equation (12) is used to describe this kinetics. The reaction rate constant $k_{f1}$ for the neodymium adsorption was evaluated as 1.81 L/mmol/min for the fitting parameter.

The film-pore model described by equations (15) and (16) is used to describe kinetics. An average particle diameter of 153 μm in the range 125-180 μm is used in these calculations. The fitting parameters of the pore diffusion model are the molecular diffusivity, $D_M$, and tortuosity, $\tau$, and are determined to be 1.33×10$^{-9}$ m$^2$/s and 3, respectively. The calculated values of the pore diffusion coefficient Dp and the forward reaction constant $k_{f1}$ are summarized in Table 2. Both models show good agreement with AARD analysis.

Figure 9:
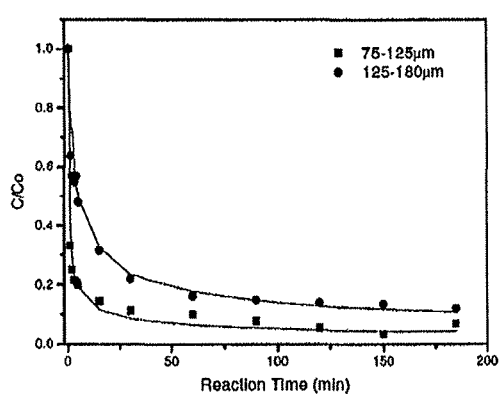
FIG. 9 is a graphical illustration showing adsorption kinetics of neodymium (III) for different particle sizes, according to an embodiment of the present invention.

To determine whether chemical reaction or pore diffusion in the pellet is the adsorption-controlling step, a series of experiments were conducted at different adsorbent particle diameters. FIG. 9 shows adsorption kinetics of neodymium (III) for different particle sizes (Conditions: concentration of Nd(III)=0, I mmol/L, weight of adsorbent=0.2 g, volume=200 mL, pHi 3.2, particle size=75 μm-125~μm and 125 μm-180 μm. Solid lines represent predictions of the Eqs 13-16; $D_p$=2.27×10$^{-9}$ m$^2$/s; r=3: AARD=0.09). FIG. 9 represents the apparent adsorption kinetics is affected by the particle sizes, thus it can be concluded that the diffusion of neodymium (III) ions in pores controls the adsorption process. Accordingly, the pore diffusion equations along with initial and boundary conditions are used to describe the fixed bed.

TABLE 2

Kinetic Results of Overall chemical Reaction and Film Pore Model

| model | overall AARD | $D_p$ | $k_{f1}$ |
|---|---|---|---|
| chemical reaction | 0.07 | | 1.81 L/mmol/min |
| Film pore | 0.03 | 2.27 × 10$^{-9}$ m$^2$/s | |

Example 8

Breakthrough Curve

This example describes the breakthrough experiment, and the resulting breakthrough curve.

Figure 10:
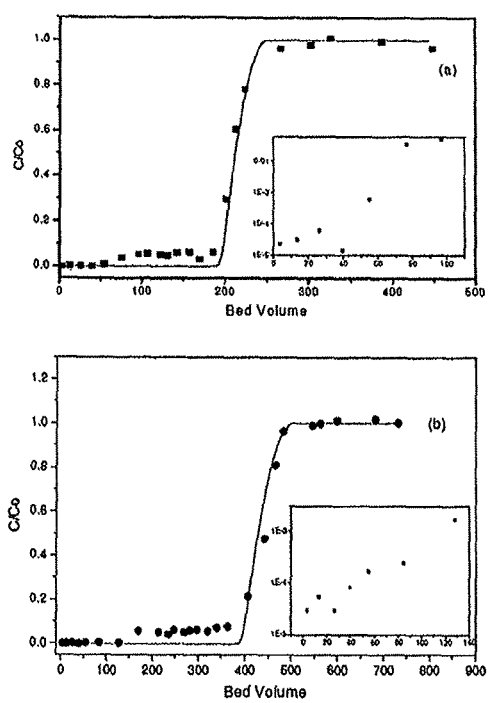
FIGS. 10a-b are a graphical illustrations showing breakthrough curves of neodymium on a fixed bed column, according to an embodiment of the present invention.

The breakthrough experiment is performed with a 0.7 cm ID column packed with 0.3 g of adsorbent to evaluate the performance in a fixed bed adsorption column. This experiment is conducted using a neodymium concentration of 1 mmol/L at pH 3.2 and 6. FIG. 10 shows breakthrough curve of neodymium on fixed bed column: (a) I bed volume=0.462 mL, [Nd]$_{feed}$=1 mmol/L at pH 3.2, volume=250 mL, weight of adsorbent=0.3 g, Q=0.83 mL/min, capacity=0.3 mmol/g; (b) 1 bed volume=0.462 mL, (Nd]$_{feed}$=1 mmol/L at pH 6.0, volume=350 mL, weight of adsorbent=0.3 g, Q=0.88 mL; 0.3 g, Q=0.88 mL/min., capacity=0.62 mmol/g. Solid lines represent predictions of eqs 13-16; $D_p$=2.27×10$^{-9}$ m$^2$/s; r=3. As shown in FIG. 10(a), the effluent concentrations are observed to be below 0.5 mg/L for up to 54 bed volumes. Approximately 5% of neodymium from the feed concentration is leached from the column after approximately 80 bed volumes until the major breakthrough occurs at 200 bed volumes.

The breakthrough curve at pH 6 is shown in FIG. 10(b). Earlier leaching of neodymium is also observed for those experimental conditions. However, leaching of neodymium and the major breakthrough emerged late compared with experiment performed at pH 3.2.

Because neodymium does not become complexed in the experimental pH range as shown in the speciation diagram, this earlier leaching of neodymium(III) may be due to discharge of adsorbed free neodymium ions on adsorbent.

This pore diffusion model represents well breakthrough curve slope and the breakthrough capacity of the experimental (C/C$_0$=1.0) by using the diffusivity ($D_M$) of Nd(III) ions and the tortuosity (t) of the adsorbent obtained from the batch kinetics modeling. The breakthrough capacities for Nd(III) ions are 0.30 and 0.33 mmol/g as determined by the breakthrough experiment and by the pore diffusion model, respectively. The difference of capacity is due to the earlier leaching of neodymium ions.

Figure 11:
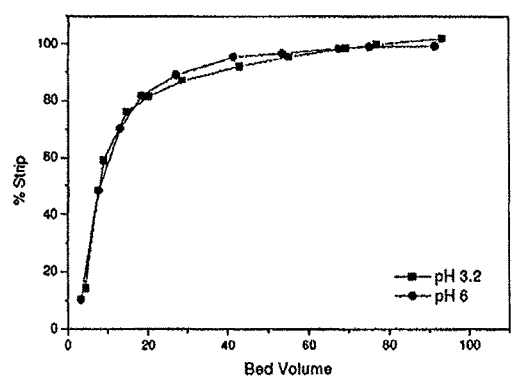
FIG. 11 is a graphical illustration stripping test results of neodymium using 1 M $HNO_3$, according to an embodiment of the present invention.

Adsorption of neodymium(III) does not occur in strong acidic solution based on pH dependence experiment. Thus a 1 M HNO$_3$ solution is used as the stripping agent for neodymium, and this solution demonstrates good stripping efficiency. The subsequent stripping of the loaded neodymium using 1 M HNO$_3$ (Stripping test results of neodymium using 1 M HNO$_3$) is shown in FIG. 11 (Conditions: weight of adsorbent=0.3 g, volume of I M HNO$_3$ 50 mL, 1 bed volume=0.462 mL, Q=1.08 mL/min.). A stripping efficiency of 89.8% at 29 bed volumes and 99.0% at 75 bed volumes is obtained. To complete the cycle and prepare for subsequent adsorption, the nitrate ions from the stripping solution are rinsed from the column by washing with DI water.

Since the desorption of neodymium ion from the adsorbent is the reverse process of the sorption, it may undergo the following stripping mechanisms.

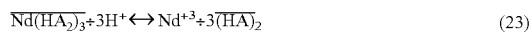

$$\overline{Nd(HA_2)_3} + 3H^+ \leftrightarrow Nd^{+3} + 3\overline{(HA)_2} \quad (23)$$

Protons replace adsorbed neodymium complexes, thereby reactivating the sites to the organo phosphorus groups. This demonstrates that the adsorbent particles can be reused to collect neodymium ions.

Example 9

Batch Selectivity

This example describes the batch selectivity experiment, and the results of the batch selectivity experiment.

The selectivity for different metals [Nd(III), Eu(III), Er(III), Y(III)] is investigated and the results are presented in Table 3, below. Equimolar concentrations of each metal (0.5 mmol/L) in 20 mL solution at pH 3 and 6 are contacted with 0.02 g of adsorbent. Results show low selectivity of the adsorbent for Nd(III) and other selected lanthanide ions at pH 3. The separation ratio of lanthanide ions is increased at pH 6 compared with a batch contact selectivity experiment of pH 3. This behavior may be due to the formation of hydrolytic species of four selected lanthanide ions at pH6. Although most of the lanthanides are present as free ions at pH 3, the ratio of hydrolytic species of each lanthanide start to change at pH 6 in the aqueous solution based on the individual thermodynamic constants. Di-(2-ethylhexyl) phosphoric acid (HDEHP) based adsorbent will provide a high separation factor for the lanthanide elements (see Sivaraman, N.; Kumar, R.; Subramaniam, S.; Vasudeva Rao, P., Separation of lanthanides using ion-interaction chromatography with HDEHP coated columns. Journal of Radioanalytical and Nuclear Chemistry 2002, 252, (3), 491-495).

TABLE 3

Results from Batch Contact Selectivity Experiments.[a]

| metal ion | % extraction | | metal ion | % extraction | |
|---|---|---|---|---|---|
| | pH 3 | pH 6 | | pH 3 | pH 6 |
| Nd(III) | 28 | 40.2 | Eu(III) | 26.6 | 63.1 |
| Er(III) | 25.6 | 49.2 | Y(III) | 27 | 67.6 |

[a]Conditions: equimolar concentration of each metal (0.5 mmol/L) at pH 3 and 6; adsorbent = 0.02 g; volume = 20 mL; contact time = 24 h Example 10

Column Selectivity

This example describes the column selectivity experiment, and the results of the column selectivity experiment.

Figure 12:
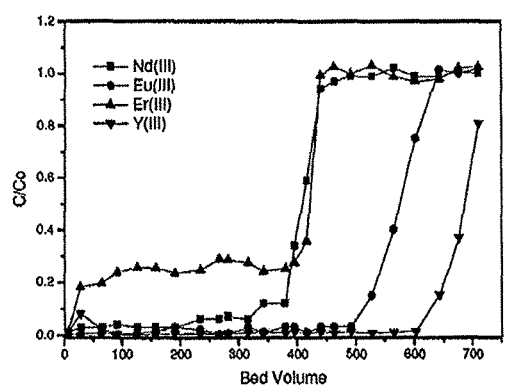
FIG. 12 is a graphical illustration showing multi-metal Breakthrough curves for equimolar amount of neodymium (III), europium(III), erbium(III), and yttrium(III) on an adsorbent bed, according to an embodiment of the present invention.

A simulated solution sample is also passed through a fixed bed column with the adsorbent to demonstrate the adsorption potential to remove neodymium in the presence of the other ions. FIG. 12 shows the multi-metal breakthrough curves for equimolar amount of Nd(III), Eu(III), Er (III), and Y(III) on an adsorbent bed in the column at a flow rate of 0.90 mL/min at pH 6 (Conditions: 1 bed volume=0.46 mL, loading with $[Ln]_{Total}$=1 mmol/L at pH 6, volume: 350 mL, weight of adsorbent=0.3 g, Q: 0.90 mL/min.). Based on preliminary and batch selectivity results, multi metal column separation at pH 3 did not show selectivity of lanthanide, thus the results are not reported here.

Figure 13:
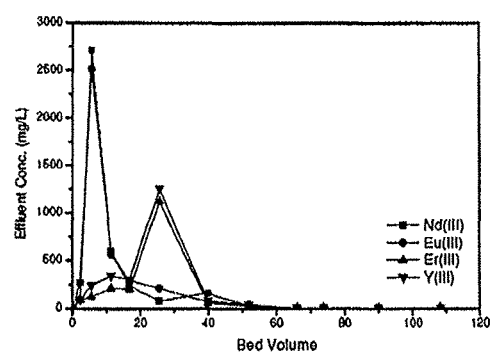
FIG. 13 is a graphical illustration showing multi-metal column stripping according to an embodiment of the present invention.

Breakthrough appears at a similar loading bed volume in case of neodymium and erbium at almost 400 bed volumes, followed by europium and yttrium. FIG. 12 demonstrates that the adsorption tendency of Nd(III) in this simulant solution was not significantly different from the results predicted on the basis of the column experiment using Nd(III) only. FIG. 13 shows multi-metal column stripping (Conditions: 1 bed volume=0.46 mL, stripping with 1 mol/L nitric acid, washing with 10 mL of DI water.). As shown in FIG. 13, when 88% of neodymium was stripped with 1 mol/L nitric acid, 66% of europium, 21% of erbium, and 27% of yttrium was co-stripped by 17 bed volumes. Subsequently, the erbium and yttrium are stripped as most of the competing neodymium and europium have been removed. Neodymium(III) separation of such lanthanide mixtures will be achieved by multiple column loading and stripping due to the different effluent concentration of neodymium and other lanthanides. Another option is to use a reagent that is considered to be most effective for the selective separation of lanthanides from actinides in the TALSPEAK process, Diethylenetriaminepentaacetic acid (DTPA). In our preliminary studies we also noted that the separation factor of Nd(III)/Er(III) increased from 1.1 to 1.9 in the presence of 5 mmol/L DTPA at pH3. These results suggest a possible method to separate of neodymium in lanthanide mixtures.

Example 11

Regeneration of Column

Figure 14:
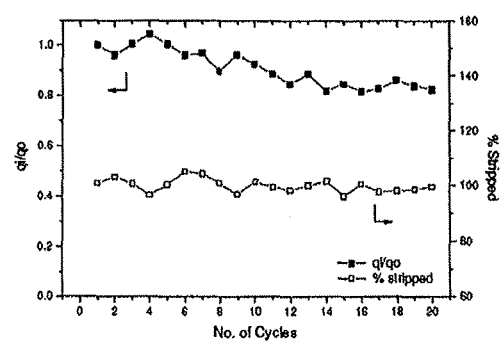
FIG. 14 is a graphical illustration showing a stability test of adsorbent for multiple adsorption and desorption cycles, according to an embodiment of the present invention.

This example describes the testing of the adsorbent stability for multiple adsorption/desorption operation in the fixed bed scheme for 20 continuous cycles using 1 M $HNO_3$. The stability is measured as $q_i/q_o$ between a subsequent $i_{th}$ loading $q_i$ and the initial neodymium(III) loading $q_o$. FIG. 14 shows stability test of adsorbent for multiple adsorption and desorption cycles. where $q_i$ is the neodymium uptake capacity after the $i^{th}$ cycle and $q_o$ is the neodymium uptake capacity after the first cycle. Loading was performed with 200 mL of a 1 mmol/L Nd(III) solution at pH 3.2, stripping was performed with 50 mL (BV=108) of 1 M $HNO_3$, and washing was performed with 10 mL of DI water. The neodymium adsorption capacity gradually decreases and retains 80% of the first neodymium adsorption capacity throughout the test period (FIG. 14). The small fraction of the adsorbent that is not regenerated is likely due to irreversible neodymium binding through strong interaction.

Example 12

Comparison to Other Adsorbent

This example describes the comparison of the neodymium extraction performance to other adsorbents, as shown in Table 4, below, where experimental maximum capacity, equilibrium time, and regeneration cycles are compared. Among these materials found in the literature, amberite XAD-4 resin based bicine display fast equilibrium time and relatively good capacity, however regeneration information was not provided in their research. For the system of polymer gel particles of alginic acid, the maximum capacity is as high as the materials of this study whereas the equilibrium time is longer. These results implying that the organo phosphorus functionalized adsorbent show relatively minimal mass transfer resistances and that more feasible operation conditions can be employed in column adsorption studies. Further, the widely used octyl (phenyl)-N,N-diisobutylcarbamoyl-methylphosphine oxide (CMPO) ligand in the TRUEX process has good durability and reusability up to 20 cycles, however neodymium sorption capacity is only half of our phosphorus based adsorbent.

TABLE 4

Comparison to Other Materials for Nd(III) Adsorption

| Material | Functional group | Q (mg/g) | Equilibrium time | Regeneration cycles | References |
|---|---|---|---|---|---|
| Sol-gel | Phosphorate | 160 | 60 min | 20 | This work |
| Amberite XAD-4[2] | bicine ligand | 86.5 | 15 min | — | Dev, K. et al. 1999 |
| Amberite XAD-4[5] | functionalized ethylamine | 129.8 | — | — | Kaur, H et al. 2005 |
| Polymer gel[30] | Alginic acid | 160 | 120 min | — | Konishi, Y. et al. 1992 |
| MCM resin[31] | CMPO | 72 | — | 20 | Siva Kesava Raju, C. et al. 2007 |

As shown and described in the above-referenced Examples, a high performance organo-ceramic functionalized adsorbent with organo phosphorus functional groups has been prepared through the sol-gel synthesis method. This adsorbent is characterized for neodymium (III) ions separation from aqueous streams. The adsorbent exhibits potential to separate lanthanides. A high adsorption capacity of 1.13 mmol/g is observed at pH 6; however, the capacity decreases with decrease in solution pH. The adsorption equilibrium data are represented by the ion equilibrium model, and values of $K_{Eq}$ are reported for low (4.54 $g^2/L^2$) and high (2.12 $g^2/L^2$) solution ionic strength. Analysis of neodymium(III) adsorption indicates a 1:3 complexation mechanism between adsorbent sites and neodymium species.

Kinetic studies confirm that almost all neodymium(III) ion removal takes place within 60 min for all concentration ranges and conditions studied. In fixed bed adsorption, an intermediate, small breakthrough of five percent of feed neodymium concentration occurs before major breakthrough curve. This minor breakthrough could be due to discharge of adsorbed free neodymium ions on adsorbent.

Because apparent adsorption kinetics is affected by the particle sizes, film pore diffusion equations are applied to predict the kinetics and fixed bed experiments.

Neodymium stripping is found viable for a fixed bed adsorption with stripping efficiencies greater than 99% using 1 M $HNO_3$. Moreover, stability of the adsorbent using in this study over multiple adsorption/desorption cycles is demonstrated with 90% of the original capacity retained after 10 cycles, and loss of 19% of capacity until 20 cycles of operation.

While several embodiments of the invention have been discussed, it will be appreciated by those skilled in the art that various modifications and variations of the present invention are possible. Such modifications do not depart from the spirit and scope of the present invention.

What is claimed is:

1. A method of removing at least one rare earth element from an aqueous solution having at least one rare earth element comprising the steps of:
   (a) providing an adsorbent selective to adsorb the at least one rare earth element, wherein the adsorbent is high density silyl-propyl-diethyl phosphonate;
   (b) contacting the aqueous solution with said adsorbent; and
   (c) adsorbing the at least one rare earth element from the aqueous solution to produce a product aqueous solution having reduced rare earth element containing compounds.

2. The method of claim 1, wherein the step of contacting is static contacting.

3. The method of claim 1, wherein the step of contacting is a dynamic contacting, comprising the step of passing the aqueous solution through a column packed with the adsorbent.

4. The method of claim 1, wherein the step of contacting is performed at a pH of between 0.5 and 6.

5. The method of claim 4, wherein the step of contacting is performed at a pH of about 6.

6. The method of claim 1, wherein the at least one rare earth element is a lanthanide.

7. The method of claim 6, wherein the lanthanide is selected from the group consisting of neodymium(III), europium(III), erbium(III), and yttrium(III).

8. The method of claim 7, wherein the lanthanide is neodymium(III).

9. The method of claim 7, wherein said adsorbent is in a fixed bed column.

10. The method of claim 9, further comprising the step of stripping adsorbed lanthanides from said fixed bed column creating a product stripped solution, wherein a greater percentage of neodymium(III) is stripped from said fixed bed column during passing 17 bed volumes of a stripping solution, wherein said stripping solution is 1 M $HNO_3$, through the fixed bed column as compared to europium(III), erbium(III), and yttrium(III).

11. The method of claim 10, further comprising the step of adsorbing at least a portion of the lanthanides from the product stripped solution by passing the product stripped solution through a second fixed bed column comprising said adsorbent, and the step of stripping adsorbed lanthanides from said second fixed bed column creating a second product stripped solution by passing 17 bed volumes of the stripping solution through the second fixed bed column increasing the purity of neodymium(III) in an eluent.

* * * * *